US006992033B2

(12) United States Patent
Taftaf

(10) Patent No.: US 6,992,033 B2
(45) Date of Patent: Jan. 31, 2006

(54) PROCESS FOR PREPARATION OF CATALYST COMPOSITION FOR ETHYLENE POLYMERIZATION

(75) Inventor: Mansour Izzat Taftaf, Riyadh (SA)

(73) Assignee: Saudi Basic Industries Corporation, Riyadh (SA)

(*) Notice: Subject to any disclaimer, the term of this patent is extended or adjusted under 35 U.S.C. 154(b) by 195 days.

(21) Appl. No.: 10/439,468

(22) Filed: May 16, 2003

(65) Prior Publication Data
US 2003/0220189 A1 Nov. 27, 2003

(30) Foreign Application Priority Data
May 23, 2002 (EP) ................... 02011524

(51) Int. Cl.
B01J 31/00 (2006.01)
B01J 37/00 (2006.01)
C08F 4/02 (2006.01)
C08F 4/60 (2006.01)

(52) U.S. Cl. .................. 502/103; 502/113; 502/107; 526/113; 525/240

(58) Field of Classification Search ............... 502/103, 502/113, 107; 526/113; 525/240
See application file for complete search history.

(56) References Cited

U.S. PATENT DOCUMENTS

| 5,081,090 | A | 1/1992 | Arzoumanidis |
| 5,242,549 | A | 9/1993 | Potter |
| 6,358,372 | B1 * | 3/2002 | Zum Mallen .................. 203/6 |
| 6,753,390 | B2 * | 6/2004 | Ehrman et al. ............. 526/113 |
| 6,759,362 | B2 * | 7/2004 | Job ............................ 502/113 |
| 6,790,804 | B2 * | 9/2004 | Gray et al. .................. 502/103 |
| 6,825,146 | B2 * | 11/2004 | Kilty et al. ................. 502/107 |
| 6,838,522 | B2 * | 1/2005 | Hashimoto et al. ......... 525/240 |

FOREIGN PATENT DOCUMENTS

WO  WO 02/04529  1/2002

* cited by examiner

Primary Examiner—J. A. Lorengo
Assistant Examiner—Jennine Brown
(74) Attorney, Agent, or Firm—Kramer Levin Naftalis & Frankel LLP

(57) ABSTRACT

Process for preparing a catalyst composition for ethylene polymerization or copolymerization, with the steps of: (a) treating at least one magnesium alkoxide compound with the effluent waste from a process for production of a polypropylene catalyst of the Ziegler-Natta type, the effluent waste being mainly composed of about 10 to about 20 wt.-% transition metal based compounds, about 20 to about 50 wt.-% solvents, about 0 to about 2 wt.-% electron donors and impurities; (b) washing the product of step (a) with an inert hydrocarbon solvent; and (c) drying the material for use as the catalyst composition.

18 Claims, No Drawings

PROCESS FOR PREPARATION OF CATALYST COMPOSITION FOR ETHYLENE POLYMERIZATION

BACKGROUND OF THE INVENTION

1. Field of the Invention

The present invention is related to a process for preparing a catalyst composition for ethylene polymerization or copolymerization, in particular to a Ziegler-Natta catalyst system. The catalyst system of the invention is heterogenous and comprises at least one transition metal compound, at least one magnesium compound and at least one electron donor.

2. Description of the Prior Art

Catalysts of the Ziegler-Natta type are known for the production of highly isotactic polypropylene resins and are commercially available from e.g. Union Carbide Corporation. They are described in a number of U.S. patents, namely U.S. Pat. Nos. 4,414,132, 4,329,253, 4,657,995, 4,710,482, 4,804,648, 4,414,132, 4,329,253, 4,393,182, 4,497,905, 4,548,915, 4,520,163, 4,543,389, 4,477,639, 4,535,068, 4,657,995, 4,563,512, 4,663,299, 4,710,482, 4,804,648, 4,806,696 and 4,851,499.

When preparing this type of catalyst to produce highly isotactic polypropylene, nearly 27 kg of effluent for each kg of polypropylene catalyst produced is wasted in the catalyst production process. The waste consists mainly of titanium tetrachloride (or other transition metal salts), monochloro benzene, isopentane, magnesium chloride and other chemical impurities such as $TiCl_y(EtO)_x$ compounds. The effluent waste may generally comprise from about 10 to about 20 wt.-% transition metal, from about 20 to about 45 wt.-% monochloro benzene, from about 0 to about 5 wt.-% isopentane, from about 45 to about 65 wt.-% chlorine (as chlorides) and other chemical impurities such as from about 1 to about 10 wt.-% ethoxy compounds, from about 0 to about 2 wt.-% electron donor and from about 0.5 to 5 wt.-% solids. The effluent cannot be used again to prepare another batch of polypropylene catalysts unless the impurities are removed to a high extent. Distillation as described in U.S. Pat. No. 5,242,549 may be used as a means of purifying the effluent from its impurities. However, the costs of using the technology available today for recovering the effluent is significantly high and not justified for small size plants.

Today, the generated catalyst effluent waste is collected and disposed off. Disposing such a waste, however, is cumbersome and a costly process.

Therefore, it is an object of the present invention to find a beneficial way of re-using the effluent waste from a process for production of polypropylene catalysts of the Ziegler-Natta type.

This object is solved with a process for preparing a catalyst composition for ethylene polymerization or copolymerization, with the steps of:

(a) treating at least one magnesium alkoxide compound with the effluent waste from a process for production of a polypropylene catalyst of the Ziegler-Natta type, the effluent waste being mainly composed of about 10 to about 20 wt.-% transition metal based compounds, about 20 to about 50 wt.-% solvents, about 0 to about 2 wt.-% electron donors, and impurities;

(b) washing the product of step (a) with an inert hydrocarbon solvent; and (c) drying the material for use as the catalyst composition.

Preferably, the transition metal based compounds comprise titanium tetrachloride, and the amount of titanium tetrachloride in the catalyst composition is preferably in the range of 1 to 10 wt. %, most preferably 2.5 to 3.5 wt. %.

In a preferred embodiment of the invention, the titanium loading of the catalyst composition is adjusted by adding excess electron donor to the effluent before adding to the magnesium alkoxide compound.

Preferably, the magnesium alkoxide compound comprises magnesium ethoxide, wherein the ethoxide content in the catalyst composition is preferably in the range of 1 to 9 wt. %, most preferably 2 to 5 wt. %, whereas the magnesium content in the catalyst composition is preferably in the range of 5 to 25 wt. %, most preferably 15 to 20 wt. %.

Preferably, the electron donor is a compound selected from the group consisting of ethyl benzoate and diisobutylphthalate, wherein the content of electron donor in the produced catalyst composition is preferably in the range of 0.01 to 20 wt. %, most preferably 10 to 15 wt. %.

The invention is also directed to processes for polymerization of ethylene to a high molecular weight polyethylene or for copolymerization of ethylene with a linear alpha-olefin using the catalyst composition according to the present invention.

Surprisingly, we have discovered that the effluent waste from a process for the production of polypropylene catalysts of the Ziegler-Natta type can effectively be used to manufacture a series of superactive catalysts for the polymerization or copolymerization of ethylene, without the need to purify the effluent and reclaim the essential products from it. No new equipment or retrofitting is needed to prepare the catalysts using the effluent. The catalysts can be prepared in the same plant facilities, which are used to prepare the prior art catalysts. The preparation of these new catalysts in this invention utilizes the prior art effluent which certainly will have a tremendous impact on the catalyst manufacturing efficiency for both polyethylene and polypropylene production.

The new catalysts produced from the crude effluent were examined closely in the lab and showed highly activity performance.

DETAILED DESCRIPTION OF THE INVENTION

The polymerization of ethylene to polyethylene is a relatively uncomplicated process when compared with the polymerization of higher alpha olefin monomers such as propylene. Alpha olefin polymerization monomers can form three different steric types of polymers due to the alkyl group attached to the monomer. Today, highly isotactic polypropylene resins are useful in the plastic industry, and more valuable than the atactic and syndiotactic structures.

The preparation of catalysts for use in such processes is relatively complicated. Moreover, in the industry today, successful catalysts of this type generate large amount of waste. This process waste called "effluent" is composed mainly of titanium (or other transition metal) based compounds, solvents, electron donors and impurities. Titanium halides materials are the major and most valuable components in the effluent and they are the principal source of active sites of the catalyst of the present invention. Solvents are the second main components in the effluent. These solvents end up in the effluent during the catalyst preparation because part of it is used as a reaction medium and the other part is used to wash the catalyst at the end of the preparation. Impurities and electron donors are next in term of their quantity in the effluent. The impurities are generated mainly as byproducts during the reaction of the ingredients with each other and the catalyst support source. They are mainly mixtures of chlorinated components of the form $Ti(RO)_yCl_x$, EB and $TiCl_4 \cdot nEB$ complexes. The x value can be between zero and four, whereas y can be between four and zero, respectively. They are accumulated into a critical concentration at which active propylene catalysts can no longer be prepared from the effluent, until these impurities are isolated and disposed off. Solid components are also found in the effluent. These solids are either catalyst solids passed through catalyst filter cloth or solids formed from the impurities through side reactions. Almost all solids are isolated from the liquid effluent and disposed off separately. In the industry today, the effluent is fed into two vacuum distillation columns to recover both titanium halides and the solvents and dispose the impurities as described in U.S. Pat. No. 5,242,549

In this invention, it was discovered that the effluent can be used to prepare highly active Ziegler-Natta catalysts for the polymerization or copolymerization of ethylene without the need to isolate titanium halides from the rest of the effluent components. Titanium halides can be extracted from the effluent by direct contact with magnesium alkoxides and form active polyethylene catalysts despite the presence of the impurities. The impurities show no harmful effects on the catalysts prepared to polymerize ethylene, whereas they demonstrate a contrary effect to catalysts used for propylene polymerization. The performance and activity of these catalysts was superior to other Ziegler-Natta catalysts utilized commercially in the industries today.

EXAMPLES

Example 1

1.1. Catalyst Preparation 4.4 grams of magnesium ethoxide were placed in a custom designed glass flask fitted with a medium pore size fritted disk. 110 ml of decanted effluent waste was added on top thereof and the two components were heated up to 110° C. for one hour with continuous stirring. The excess liquid was decanted at the end of one hour and the resulting yellow solid of the catalyst was washed with isopentane six times to remove the residual non-reacted effluent materials from the catalyst solid. The catalyst was then left overnight to dry by ultra pure nitrogen flowing through the flask filter.

Samples of the catalyst were characterized for titanium (6.2 wt %), magnesium (18.5 wt %) as well as organic composition such as ethoxide content (4.9 wt %), monochloro benzene (0.1 wt %), isopentane (0.52 wt %) and ethylbenzoate (9.5 wt %).

1.2. Catalyst Polymerization Performance

Ethylene polymerization was carried out over this catalyst at 15 bars of ethylene including 3 bars hydrogen partial pressure and TEAL (triethylaluminum alkyl) was used as the polymerization cocatalyst to result in a Al/Ti molar ratio of about 150. The reaction was run for one hour at a temperature of 85° C.

The lab polymerization run of this catalyst produced nearly 310 grams of homo-polyethylene resin with a productivity close to 40 kg PE/g catalyst and an activity of 438.4 kg PE/g Ti.

Example 2

2.1. Catalyst Preparation 7.6 grams of magnesium ethoxide were placed in a custom designed glass flask fitted with medium pore size fritted disk. 190 ml of decanted effluent waste was added on top thereof and the two components were heated up to 110° C. for one hour with continuous stirring. The excess liquid was decanted at the end of one hour and the resulting yellow solid of the catalyst was washed with isopentane six times to remove the residual non-reacted materials from the catalyst solid. The catalyst then was left overnight to dry by ultra pure nitrogen flowing through the flask filter.

Samples of the catalyst were characterized for titanium (6.2 wt %), magnesium (15.6 wt %) as well as organic composition such as ethoxide content (6.4 wt %), monochloro benzene (0.04 wt %), isopentane (0.58 wt %) and ethylbenzoate (9.8 wt %).

2.2. Catalyst Polymerization Performance

Ethylene polymerization was carried out over this catalyst at 15 bars of ethylene including 3 bars hydrogen partial pressure and TEAL (triethylaluminum alkyl) was used as the polymerization cocatalyst to result in a Al/Ti molar ratio of about 150. The reaction was run for one hour at a temperature of 85° C.

The lab polymerization run on this catalyst produced nearly 210 grams of homo-polyethylene resin with a productivity close to 27.2 kg PE/g catalyst and an activity of 647.2 kg PE/g Ti.

Example 3

3.1. Catalyst Preparation 4.4 grams of magnesium ethoxide were placed in a custom designed glass flask fitted with medium pore size fritted disk. 110 ml of decanted effluent waste was added on top thereof followed by 1.84 ml of ethylbenzoate. The three components were heated up to 110° C. for one hour with continuous stirring. The excess liquid was decanted at the end of one hour and then an additional 110 ml of fresh effluent was added followed by 0.46 ml of benzoyl chloride. The content stirred again for one half hour at 110° C., then the excess liquid was decanted again. A third amount of 110 ml of fresh effluent was used again and the flask was heated to 110° C. for another one half-hour. Finally, the excess liquid was decanted and the resulting yellow solid of the catalyst was washed with isopentane six times to remove the residual non-reacted materials from the catalyst solid. The catalyst then was left overnight to dry by ultra pure nitrogen flowing through the flask filter.

Samples of the catalyst were characterized for titanium (3.7 wt %), magnesium (18.3 wt %) as well as organic composition such as ethoxides content (2.2 wt %); monochloro benzene (<0.1 wt %), isopentane (<0.1 wt %) and ethylbenzoate (14.1 wt %).

3.2. Catalyst Polymerization Performance

Ethylene polymerization was carried out over this catalyst at 15 bars of ethylene including 3 bars hydrogen partial pressure and TEAL (triethylaluminum alkyl) was used as the polymerization cocatalyst to result in a Al/Ti molar ratio of about 150. The reaction was run for one hour at a temperature of 85° C.

The lab polymerization run on this catalyst produced nearly 394 grams of homo-polyethylene resin with a productivity of 30.4 kg PE/g catalyst and an activity of 822.5 kg PE/g Ti.

Example 4

4.1. Catalyst Preparation 4.4 grams of magnesium ethoxide were placed in a custom designed glass flask fitted with medium pore size fritted disk. 110 ml of decanted effluent waste was added on top thereof followed by 3.6 ml ethylbenzoate and the three components were heated up to 110° C. for one hour with continuous stirring. The excess liquid was decanted at the end of one hour and the resulting yellow solid of the catalyst was washed with isopentane six times to remove the residual non-reacted materials from the catalyst solid. The catalyst then was left overnight to dry by ultra pure nitrogen flowing through the flask filter.

Samples of the catalyst were characterized for titanium (1.5 wt %), magnesium (9.5 wt %) as well as organic composition such as ethoxide content (2.4 wt %); monochloro benzene (0.1 wt %), isopentane (<0.1 wt %) and ethylbenzoate (15.2 wt %).

4.2. Catalyst Polymerization Performance

Ethylene polymerization was carried out over this catalyst at 15 bars of ethylene including 3 bars hydrogen partial pressure and TEAL (triethylaluminum alkyl) was used as the polymerization cocatalyst to result in a Al/Ti molar ratio of about 150. The reaction was run for one hour at a temperature of 85° C.

The lab polymerization run on this catalyst produced nearly 292 grams of homo-polyethylene resin with a productivity of 9.1 kg PE/g catalyst and an activity of 609.6 kg PE/g Ti.

Example 5

5.1. Catalyst Preparation 4.4 grams of magnesium ethoxide were placed in a custom designed glass flask fitted with medium pore size fritted disk. 110 ml of decanted effluent waste was added on top thereof followed by 3 ml benzoyl chloride and the three components were heated up to 110° C. for one hour with continuous stirring. The excess liquid was decanted at the end of one hour and the resulting yellow solid of the catalyst was washed with isopentane six times to remove the residual non-reacted materials from the catalyst solid. The catalyst then was left overnight to dry by ultra pure nitrogen flowing through the flask filter.

Samples of the catalyst were characterized for titanium (2.92 wt %), magnesium (16.3 wt %) as well as organic composition such as ethoxide content (2.93 wt %), monochloro benzene (<0.1 wt %), isopentane (0.1 wt %) and ethylbenzoate (17.3 wt %).

5.2. Catalyst Polymerization Performance

Ethylene polymerization was carried out over this catalyst at 15 bars of ethylene including 3 bars hydrogen partial pressure and TEAL (triethylaluminum alkyl) was used as the polymerization cocatalyst to result in a Al/Ti molar ratio of about 150. The reaction was run for one hour at a temperature of 85° C.

The lab polymerization run on this catalyst produced nearly 99 grams of homo-polyethylene resin with a productivity of 6.0 kg PE/g catalyst and an activity of 206 kg PE/g Ti.

Example 6

6.1. Catalyst Preparation 300 grams of magnesium ethoxide were placed in a 12-liter pilot unit glass vessel equipped with electric stirrer. 1500 ml of decanted effluent waste was added on the top thereof and the two components were heated up to 90° C. for one and a half hour with continuous stirring. The excess liquid was decanted and the resulting yellow solid of the catalyst was washed with isopentane six times to remove the residual non-reacted material from the catalyst solid. The catalyst was heated up to 65° C. and left to dry under vacuum.

Samples of the catalyst were characterised for titanium (9.5 wt.-%), magnesium (15.8 wt.-%) as well as organic composition such as ethoxide content (8 wt.-%), monochloro benzene (1.6 wt.-%) isopentane (0 wt.-%), and ethylbenzoate (0.07 wt.-%).

6.2. Catalyst Co-Polymerization Performance

Ethylene co-polymerization with hexene was carried out over this catalyst at 15 bars of ethylene including 3 bars of hydrogen partial pressure, 50 ml hexene-1, and TEAL (tryethyl aluminum alkyl) was used as the co-polymerization co-catalyst to result in a Al/Ti molar ratio of about 150. The reaction was run for 1 hour at a temperature of 85° C.

The lab polymerization run of this catalyst produced nearly 600 grams of polyethylene copolymer resin with a productivity close to 12 kg PE/g catalyst and an activity of 126.3 kg PE/g Ti.

The features disclosed in the foregoing description and/or in the claims may, both separately and in any combination thereof, be material for realising the invention in diverse forms thereof.

What is claimed is:

1. A process for preparing a catalyst composition for ethylene polymerization comprising:
   (a) adding at least one magnesium alkoxide compound to the catalyst effluent waste from the production of a polypropylene catalyst of the Ziegler-Natta type to form a magnesium alkoxide waste effluent mixture, the catalyst effluent waste being comprised of about 10 to about 20 weight percent transition metal based compounds, about 20 to about 50 weight percent solvents, and about 0 to about 2 weight percent electron donor compound, and reacting said mixture to form a reaction product;
   (b) washing the reaction product of step (a) with an inert hydrocarbon solvent; and
   (c) drying washed product of step (b) to form an ethylene polymerization catalyst composition.

2. The process according to claim 1, wherein the transition metal based compounds comprise titanium tetrachloride.

3. The process according to claim 2, wherein the concentration of titanium tetrachloride in the ethylene polymerization catalyst composition is in the range of 2.5 to 3.5 weight percent.

4. The process according to claim 1, wherein the magnesium alkoxide compound comprises magnesium ethoxide.

5. The process according to claim 3, wherein the magnesium alkoxide compound comprises magnesium ethoxide.

6. The process according to claim 5, wherein said ethylene polymerization catalyst composition comprises 2% to 5% by weight of ethoxide.

7. The process of claim 1, wherein said ethylene polymerization catalyst composition comprises 15% to 20% by weight of magnesium.

8. The process of claim 3, wherein said ethylene polymerization catalyst composition comprises 15% to 20% by weight of magnesium.

9. The process of claim 2, wherein said electron donor compound comprises ethyl benzoate or diisobutylphthalate.

10. The process of claim 4, wherein said electron donor compound comprises ethyl benzoate or diisobutylphthalate.

11. The process of claim 6, wherein said electron donor compound comprises ethyl benzoate or diisobutylphthalate.

12. The process of claim 3, wherein said electron donor compound comprises 10% to 15% by weight of said ethylene polymerization catalyst composition.

13. The process of claim 6, wherein said electron donor compound comprises 10% to 15% by weight of said ethylene polymerization catalyst composition.

14. The process of claim 11, wherein said electron donor compound comprises 10% to 15% by weight of said ethylene polymerization catalyst composition.

15. The process of claim 11, wherein the electron donor compound comprises 10% to 15% by weight of said ethylene polymerization catalyst composition.

16. A process for the polymerization of ethylene comprising contacting ethylene with a ethylene polymerization catalyst composition made according to the process of claim 1 under polymerization conditions.

17. The process of claim 16, wherein said transition metal based compounds comprise titanium tetrachloride, said magnesium alkoxide compound comprises magnesium ethoxide and said electron donor compound comprises ethyl benzoate or diisobutylphthalate.

18. The process of claim 17, wherein said titanium tetrachloride comprises 2.5% to 3.5% by weight of the ethylene polymerization catalyst composition, said electron donor compound comprises 10% to 15% by weight of said ethylene polymerization catalyst composition and magnesium comprises 15% to 20% by weight of said ethylene polymerization catalyst composition.

* * * * *